United States Patent [19]

Ogino

[11] Patent Number: 4,705,093
[45] Date of Patent: Nov. 10, 1987

[54] METHOD OF CASTING THE FIBER-REINFORCED CALIPER

[75] Inventor: Kinji Ogino, Kuki, Japan

[73] Assignees: Akebono Brake Industry Co., Ltd.; Akebono Research and Development Centre Ltd., both of Tokyo, Japan

[21] Appl. No.: 875,727

[22] Filed: Jun. 18, 1986

[30] Foreign Application Priority Data

Jun. 20, 1985 [JP] Japan .................. 60-135026

[51] Int. Cl.$^4$ ............................................. B22D 19/14
[52] U.S. Cl. ........................................ 164/97; 164/110
[58] Field of Search .................. 164/97, 108, 109, 110

[56] References Cited

FOREIGN PATENT DOCUMENTS 137261 4/1985 European Pat. Off. .............. 164/97

Primary Examiner—Kuang Y. Lin
Attorney, Agent, or Firm—Oblon, Fisher, Spivak, McClelland, & Maier

[57] ABSTRACT

A method of casting a fiber-reinforced caliper wherein inorganic fiber is wound up in a direction parallel to the axis of cylinder around a core conforming approximately to the inside shape of the bridge portion of a caliper, the wound-up fiber is cut off in the shape of the bridge, and matrix metal is cast onto the cut-off molding of fiber under high pressure to form the shape of caliper, or the whole shape of caliper is formed by a casting method after the bridge portion is formed by casting under high pressure.

2 Claims, 6 Drawing Figures

METHOD OF CASTING THE FIBER-REINFORCED CALIPER

BACKGROUND OF THE INVENTION

The present invention relates to a method of casting the fiber-reinforced caliper. In more detail, the invention concerns a simple method of tucking up the reinforced material of an assemblage of inorganic fiber with matrix metal into the bridge portion of a caliper by casting to make it possible to improve the characteristics of caliper and at the same time to decrease its weight.

For the body of a caliper, a part of the disk brake for a car, FCD (ductile cast iron) has been used generally up to this time, but a change to aluminum has been investigated to satisfy the recent requirement of the lightening in weight, mass production being partly realized. However, the caliper made from aluminum alloy by casting has a shortcoming that it can be used only in light duty, since the rigidity is lowered compared with the caliper using FCD and, in particular, the reduction in the strength at high temperature that it causes.

From the viewpoint of functionality, a so-called fist type caliper can be divided into three portions; the bridge portion receiving the axial force of piston, the cylinder portion guiding the piston to keep the fluid pressure and the guide portion guiding the caliper in parallel with the axis of rotor. Among these, the portion where the strength is needed particularly is the bridge portion. The invention is one, wherein fiber with a high tensile strength and elasticity is tucked up into this bridge portion by casting to reinforce and improve the shortcoming of the caliper made from aluminum alloy aforementioned. In particular, a simple and exact method has been discovered by the inventors as the method to tuck up the assemblage of fiber by casting, by which the rigidity and the strength at high temperature of the caliper can be improved.

SUMMARY OF THE INVENTION

The method of casting the fiber-reinforced caliper in accordance with the invention is characterized in that, 1. A core for winding up the fiber is prepared conforming approximately to the inside shape of the bridge portion of the caliper, and inorganic fiber is wound up in a direction parallel to the axis of cylinder around said core.
2. The wound-up fiber is cut off in the approximate shape of the bridge.
3. The matrix metal is cast onto the cut-off molding of fiber under high pressure to form the shape of caliper, or the whole shape of caliper is formed by the casting method after the bridge portion is formed by casting under high pressure.

DETAILED DESCRIPTION OF THE INVENTION

Figure 1:
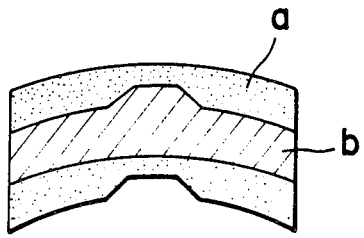
FIG. 1 (A) and (B) show the structure with the fiber wound around the core.
Figure 1:
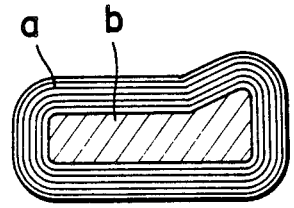

The manufacturing method of fiber-reinforced composite, wherein cast iron, copper, aluminum, magnesium, titanium or the alloys thereof are filled and compounded as matrices with the molding of fiber by the coagulation casting method under high pressure, is known publicly through, for example, Japanese Patent Publication No. 12446/1978. The method of casting the fiber-reinforced caliper in accordance with the invention uses copper, aluminum, magnesium or the alloys thereof as matrix metals and the casting into the shape of caliper is made by the casting method under high pressure. But the invention also proposes a different method, wherein only the bridge portion of caliper is formed by casting under high pressure and, thereafter, the casting into the whole shape of caliper is made by the general casting method, for example, gravity casting method. Moreover, the molding method of the assemblage of fiber according to the invention is quite unique to the invention, wherein, after fiber is wound up in a direction parallel to the axis of cylinder around the core corresponding approximately to the inside shape of the bridge portion of caliper, this assemblage of fiber is cut off in the approximate shape of the bridge. By this method, the tucking up of the assemblage of fiber into the bridge portion of a caliper by casting becomes easier and this makes the invention extremely valuable in practice.

As the fibers having high elasticity and usable in the invention, inorganic fibers such as asbestos, rock wool, glass fiber, slag wool, $Al_2O_3$ (alumina) fiber, boron fiber, ceramic fiber, etc. or carbon fiber can be mentioned. The diameter of fiber is particularly preferable to be within a range of 2 to 20 $\mu$m. The thickness of the reinforced material compounded the molding of fiber with copper, aluminum, magnesium or the alloys thereof is suitable to be about 6 to 18 mm for the purpose of the invention.

The invention will now be illustrated based on an example shown in the drawing.

Figure 2:
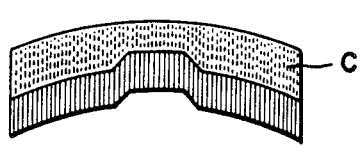
FIG. 2 (A) and (B) show the structure with the wound fiber having been cut off, and FIG. 3 (A) and (B) show the structure cast into the caliper. (A) is an oblique view and (B) is a side view in each drawing.
Figure 2:
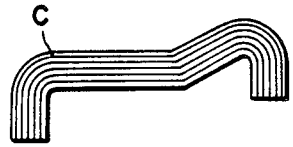
Figure 3:
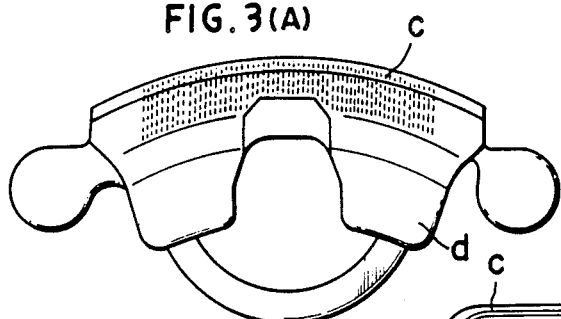
Figure 3:
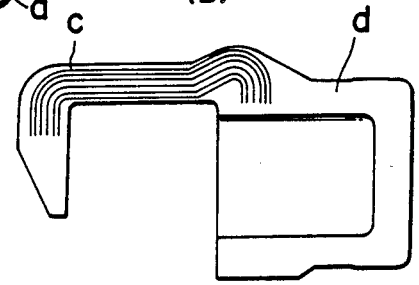

FIG. 1 (A) and (B) show the structure having the inorganic fiber wound around the core, FIG. 2 (A) and (B) show the structure with the wound fiber having been cut off wound up, and FIG. 3 (A) and (B) show the structure cast into the caliper. The method of the invention proceeds in numerical order attached to the diagrams. In each drawing, (A) is an oblique view and (B) is a side view.

According to the invention, fiber (a) is wound up first in a direction parallel to the axis of cylinder around the core (b) for winding up the fiber conforming to the inside shape of the bridge portion of caliper, the core (b) is removed and the fiber (a) is cut off in the approximate shape of the bridge of the caliper to make the molding of fiber (c). Then, onto said molding of fiber (c), copper, aluminum, magnesium or the alloys thereof are cast under high pressure as matrices to form the shape of caliper (d), or, after the bridge portion is formed by casting under high pressure, the whole shape of caliper (d) is formed by another casting method.

What is claimed is:

1. A method for casting a fiber-reinforced caliper comprising:
   (a) winding inorganic fibers around a core in a direction parallel to the cylindrical axis of said core which conforms approximately to the inside shape of the bridge portion of a caliper, (b) cutting off the fibers so wound up into the approximate shape of the bridge, and (c) casting under high pressure matrix metal onto the so cut-off fibers to form it into the shape of a caliper.

2. A method for casting a fiber-reinforced caliper comprising:

(a) winding inorganic fibers around a core in a direction parallel to the cylindrical axis of said core which conforms approximately to the inside shape of the bridge portion of a caliper, (b) cutting off the fibers so wound up into the approximate shape of the bridge, and (c) casting under high pressure matrix metal onto the so cut-off fibers to form a bridge portion, and (d) forming a caliper by incorporating said bridge portion by casting.

* * * * *